US006630528B2

(12) United States Patent
Hausmann et al.

(10) Patent No.: US 6,630,528 B2
(45) Date of Patent: Oct. 7, 2003

(54) ANTISTATIC IONOMER BLEND

(75) Inventors: Karlheinz Hausmann, Auvernier (CH); Bernard Rioux, Puteaux (FR); Jean-Marie Francois, Versonnex (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/923,653

(22) Filed: Aug. 7, 2001

(65) Prior Publication Data

US 2002/0107313 A1 Aug. 8, 2002

Related U.S. Application Data

(60) Provisional application No. 60/224,276, filed on Aug. 10, 2000.

(51) Int. Cl.$^7$ ................................. C08K 5/09
(52) U.S. Cl. .................. 524/315; 525/329.3; 525/919; 525/330.2; 525/221; 525/240; 428/35.7; 428/35.2; 428/35.5; 428/80; 428/500; 428/522; 252/510; 252/8.81; 524/910; 524/912
(58) Field of Search ................. 525/919, 329.3, 525/329.7, 330.2, 221, 240; 428/35.7, 35.2, 35.5, 80, 500, 522; 252/510, 8.81; 524/315, 910, 912

(56) References Cited

U.S. PATENT DOCUMENTS

| | | | |
|---|---|---|---|
| 3,264,272 A | 8/1966 | Rees | |
| 4,066,811 A | 1/1978 | Naito et al. | |
| 4,248,990 A | 2/1981 | Pieski et al. | |
| 4,351,931 A | 9/1982 | Armitage | |
| 4,363,886 A | 12/1982 | Lipowski et al. | |
| 5,037,875 A | * 8/1991 | deGaravilla | ......... 524/317 |
| 5,149,724 A | * 9/1992 | Fahey et al. | ......... 524/110 |

FOREIGN PATENT DOCUMENTS

| | | |
|---|---|---|
| EP | 0 524 404 A1 | 1/1993 |
| EP | 0 758 641 A1 | 2/1997 |
| EP | 1 029 890 A2 | 8/2000 |
| FR | 2 117 386 A | 7/1972 |
| JP | 58 108285 A | 6/1983 |
| JP | 10 265665 A | 10/1998 |

OTHER PUBLICATIONS

PCT International Search Report, International application No. PCT/US01/25284, dated Oct. 26, 2001.

* cited by examiner

*Primary Examiner*—David W. Wu
*Assistant Examiner*—Satya B Sastri
(74) *Attorney, Agent, or Firm*—Craig H. Evans

(57) ABSTRACT

A blend capable of being melt fabricated into an antistatic film which has improved antistatic action practically immediately after production comprises ethylene α,β-ethylenically unsaturated $C_{3-8}$ carboxylic acid copolymers having 0–90% of the carboxylic acid groups neutralized by metal ions, particularly sodium ions, and an antistatic effective amount of a polyoxyethylene sorbitan fatty acid, particularly Polyoxyethylene Sorbitan Monolaureate.

11 Claims, No Drawings

ANTISTATIC IONOMER BLEND

BACKGROUND OF INVENTION

This application claims the benefit of U.S. Provisional Application No. 60/224,276, filed Aug. 10, 2000, which is incorporated by reference as if fully set forth herein for all purposes.

FIELD OF INVENTION

This invention relates to the use of a particular antistatic additive to produce dissipation of static electricity from a polymer host, in particular from ionomers.

BACKGROUND DISCUSSION AND RELATED ART

Polymer films in the course of their handling can develop high charges of static electricity which can have harmful consequences ranging from sparking, possibly causing fires, to adhering to oppositely charged surfaces to interfere with use of the film in packaging operations. For example, film used to package food may be more advantageously handled in the packaging operation if the food is not attracted to the film. Film attraction for the food can prevent the desired wrinkle-free packaging of the food by the film and can lead to leakers in the final packaging seal.

A wide variety of antistatic compounds are available for incorporation into polymer films for reducing static electricity charges of the film, with varying efficacy depending on the polymer and the antistatic compound and the amount of the compound that can be tolerated in the film before suffering loss of other desired properties. A publication of ICI Specialty Chemicals entitled "ATMER® Antistatic Agent for Thermoplastic Polymer Applications" (November 1987) discloses a large number of antistatic compounds.

An improvement in the antistatic performance of a film of ethylene/carboxylic acid copolymer, which may be partly neutralized to form ionomer, was described in U.S. Pat. No. 5,037,875 which provided a synergistic additive combination of sorbitan monolaureate and an alkyl phenol poly (ethylene oxide). Such combination additives were found to provide an improved static decay (about 1 week) compared to individual additives and other combinations (several weeks).

The synergistic additive claimed in U.S. Pat. No. 5,037,875 provides superior antistatic properties, but has the following drawbacks: it requires a certain amount of time until the antistatic properties have fully developed and it does not function in sodium ionomers.

All references set forth anywhere in this Specification are incorporated by reference as if fully set forth herein for all purposes.

SUMMARY OF INVENTION

The present invention overcomes the above-mentioned drawbacks. It involves the discovery that the use of a certain antistatic additive improves dissipation of static electricity in ethylene $\alpha,\beta$-ethylenically unsaturated $C_{3-8}$ carboxylic acid copolymers particularly those partially neutralized with sodium. More generally, the invention involves the discovery that a certain antistatic additive which surprisingly solves the above-indicated problems of prior art formulations, even more surprisingly provides an effective antistatic effect immediately after a sheet or film is produced, whereas the best antistatic additive combinations known from the prior art need at least about 1 week to develop any significant effect on surface resistivity.

According to the invention, a blend capable of being melt fabricated into an antistatic film comprises ethylene $\alpha,\beta$-ethylenically unsaturated $C_{3-8}$ carboxylic acid copolymers having 0–99% of the carboxylic acid groups neutralized by metal ions, particularly sodium ions, and an antistatic effective amount of polyoxyethylene sorbitan mono-$C_{9-20}$ fatty acid, particularly ones having a viscosity at 25° C. of less than 2000 mega Pascal.seconds (mega Pa.s) and less than 50 ethyleneoxide groups, most particularly Polyoxyethylene Sorbitan Monolaureate.

Film or sheet which is melt fabricated from this blend has superior antistatic properties as compared to film made of antistatic compounds described in U.S. Pat. No. 5,037,875, in particular in respect of producing an effective antistatic effect very soon after formation of a film or sheet.

The invention also covers the above-defined blend, melt fabricated into the form of a sheet or a film, supported or unsupported.

Such film when extruded at temperatures above 250° C. and coated onto metal or onto a polymer film or paper displays outstanding antistatic properties. Other uses of the antistatic blend of the present invention include mono- or multi-layer films for packaging applications, sheet material incorporated in a floor tile, sheet material incorporated in auto interior components, and film incorporated in a package for dry powdery products (dry powdery package).

The invention also covers the above-defined blend further comprising at least one slip agent. By "slip agent" is meant herein an agent, particularly one capable of migrating to the surface of the sheet, that is effective in reducing the coefficient of friction between adjacent sheets or parts. Such slip agents are well know in the art and include fatty acid amides that are used in polyolefins present at a level up to 3% based on weight of the copolymer plus the antistatic agent.

The invention also covers the blend fabricated into a supported film that is surface treated such as by corona treatment after production to improve adhesion of the film to the substrate. Corona treatment is used to increase the surface energy of the film by generating therein carboxyl groups via oxidation of the polymers of the surface through electric discharge.

DETAILED DESCRIPTION OF INVENTION

The copolymers used in the present invention are ethylene $\alpha,\beta$-ethylenically unsaturated carboxylic acid copolymers or the ionomer obtained therefrom. Description of the preparation of these copolymers and the melt fabrication of film therefrom is provided in U.S. Pat. Nos. 4,248,990; 3,264,272 and 4,351,931. The copolymer can be random or non-random, but random is preferred. Preferred unsaturated acids contain 3 to 8 carbon atoms and include acrylic acid, methacrylic acid and itaconic acid. Preferably the copolymer contains 5 to 50% of the acid co-monomer based on the weight of the copolymer, and more preferably from 5 to 20 weight percent. The melt index of the copolymer is preferably less than 30 g/10 min. and more preferably less than 20 g/10 min measured in accord with ASTM D-1238, condition E, at 190° C., using a 2160-gram weight.

In the case of ionomer obtained from these acid copolymers, the preferred metal ions for neutralizing the acid groups are $Na^+$, $K^+$, $Li^+$, $Mg^{2+}$, $Ca^{2+}$ and $Zn^{2+}$. The preferred neutralization is about 10 to 99% more preferably 15 to 50% of the acid groups present in the copolymer.

Thus, the preferred copolymer is an ionomer of ethylene containing 5–20 wt % methacrylic or acrylic acid neutralized 10 to 90% with sodium.

The antistatic agent used for the invention is a polyoxyethylene sorbitan mono-fatty acid, particularly one having a viscosity at 25° C. of less than 2000 mega Pa.s, less than 50 ethyleneoxide groups, and a fatty acid chain length of from 9 to 20 carbon atoms. The most preferable antistatic agent is a polyoxyethylene sorbitan monolaureate that is commercially available from Croda France S.A. as "Crillet® I Super." Polyoxyethylene sorbitan monolaureate is a surface active compound known as an internal or external antistatic agent for a great number of plastics, yet it is surprising that it has the utility found when used in the copolymer blend according to this invention. It could not be predicted that it would provide an almost instantaneous antistatic action, nor that it would solve the long felt problems relating to achieving desired antistatic properties with ethylene α,β ethylenically unsaturated $C_{3-8}$ carboxylic acid copolymers partially neutralized with sodium ions. These sodium-based ionomers are fundamentally different from zinc-based ionomers as, in the former, the sodium ions are more concentrated in the ionic clusters whereas, in the latter, the zinc ions are concentrated in the ionic clusters as well as in the matrix of the ionomer.

The antistatic agent is uniformly incorporated into the copolymer by conventional melt blending techniques, for example, the antistatic agent is blended with molten copolymer in a manner to form a homogeneous blend, using for example an extruder. The antistatic agent can be fed to the extruder along with the copolymer feed or can be metered into the copolymer as it advances as a melt along the extruder barrel. The resultant blend can be extruded and cut into granules for subsequent melt fabrication into antistatic film or can be directly fabricated into the film. Alternatively, the antistatic agent can be melt blended with the copolymer to form a concentrate of the antistatic agent for subsequent blending with the copolymer used in the present invention. In the concentrate approach, the polymer of the concentrate may be the same as the copolymer used in the subsequent blend or can be a different polymer which, however, is miscible with the copolymer upon melt blending.

The total amount of antistatic additive present in the ultimate blend used for making the antistatic film is about 0.5 to 3.0% based on the weight of the copolymer plus the weight of the additive, preferably about 0.75 to 2.5% and even more preferably about 1.0 to 2.0% by weight.

Very surprisingly, the antistatic action of the additive according to the invention is effective almost instantaneously, after less than 1 hour from when a film or sheet is produced, whereas control compounds need at least 1 week to develop any significant effect on reduction of surface resistivity, as witnessed by the best results reported in the aforementioned U.S. Pat. No. 5,037,875 or are not at all effective as with most of the antistatic agents in the case of Na ionomers if they are added at reasonable levels (such as 2 weight %)

This "almost-instantaneous" antistatic action is extremely important during production of films where operators are exposed with static built up on the extrusion equipment.

The described additive is useful in applications where dissipative properties are important, such as supported or unsupported sheets forming floor tiles and auto interior components, where use of the additive leads to the advantage that dirt and dust attraction, which is very annoying in these applications, is largely reduced.

The described additive can even be used as an additive for ionomer sealants to produce supported films for use in dry powdery packages where it serves to reduce the occurrence of powdery contamination of the seal area and leads to more reliable package seals.

The blend of the present invention can be melt fabricated into film by conventional methods. The film can be unsupported or it can be supported as in the case of forming a coating on a substrate. In the case of supported film, this can be made by such conventional methods as extrusion coating and co-extrusion. The resultant film, whether supported or unsupported will generally have a thickness of about 0.2 to 2 mils (0.005 to 0.05 mm). Examples of substrates for supporting the film of the present invention include paper, foil, and polyolefins.

The film is especially useful for packaging articles such as powders which themselves present a static charge that would otherwise attract an oppositely static charged film. One particularly annoying problem solved by the film of the present invention is that the film—even shortly after its production and even if extruded at a temperature above 250° C.—will not attract oppositely charged powder particles to the seal area of the film package.

EXAMPLES

The improved antistatic performance of the film of the present invention is manifested by the surface resistivity of the film. The lower the surface resistivity, the better the antistatic performance. The surface resistivity is measured by applying a voltage between two electrodes on the surface. The measurement involves a surface phenomenon, wherein the antistatic additive(s) over a period of time after film manufacture exude to the film surface to cause a reduction of the surface resistivity by allowing more current flow between the electrodes. This phenomenon takes time: freshly made film shows higher surface resistivity than aged film. Thus, the surface resistivity takes some time to drop to a level where effective antistatic performance is achieved.

The improved effect on surface resistivity of the present invention manifests itself in an almost instantaneous reduction of the surface resistivity, as illustrated by the following Examples, which show that the blend according to the invention initially has a surface resistivity of the order of 1E12-11 Ohm.m whereas the best prior art blend according to U.S. Pat. No. 5,037,875 has an initial resistivity of about 1E17 Ohm.m which drops after about 1 week to about 1E13-12 Ohm.m.

The antistatic compositions are prepared by preparing a masterbatch of the antistatic additive in a copolymer of ethylene and 15% methacrylic acid (MFI=0.7 at 190° C./2.16 kg) at a 10 weight % loading. This masterbatch is added to the polymer in an extruder in various concentrations in order to prepare a pellet blend which is subsequently extruded into blown film on a Brabender-make laboratory blown film unit.

Other examples are prepared by adding the pure antistatic agent, Crillet® I Super at a level of 2% into the polymer.

The temperature profile of the extruder is as follows: (in ° C.)

|         | Zone 1 | Zone 2 | Zone 3 | Zone 4 | Die | Melt |
|---------|--------|--------|--------|--------|-----|------|
| Low T:  | 200    | 210    | 220    | 220    | 220 | ≈220 |
| High T: | 250    | 260    | 270    | 280    | 275 | ≈280 |

The film has a thickness of 100 micrometers. Test samples are then cut from this tube and conditioned at 50% relative humidity for various times. During that time and at this 50% relative humidity, the surface resistivity of the films is determined according to ASTM D257-78.

Materials used:

| | |
|---|---|
| Ionomer 1 | Copolymer of ethylene and 15% methyl acrylic acid neutralized with Zinc commercially available from E. I. du Pont de Nemours and Company, Delaware as Surlyn ®9910, MFI = 1 (190° C./2.16 kg) |
| Ionomer 2 | Copolymer of ethylene and 10% methacrylic acid neutralized with Na commercially available from E. I. du Pont de Nemours and Company as Surlyn ®1601, MFI = 1 (190° C./2.16 kg) |
| Antistatic 1 | ATMER ® 105: sorbitan monolaureate commercially available from ICI |
| Antistatic 2 | ATMER ® 508: alkyl phenol poly(ethylene oxide) commercially available from ICI |
| Antistatic 3 | CRILLET ® I Super: polyoxyethylene sorbitan monolaureate commercially available from Croda France S.A |
| Concentrate 1 | 10% of a 50/50 wt % ratio mixture of ATMER ® 105 and ATMER ® 508, in a copolymer of ethylene and 15% of methacrylic acid |

Composition of the films:

| Film | Composition |
|---|---|
| Control 1 | Ionomer 1 at 220° C. |
| Control 2 | Ionomer 1 + 20% of Concentrate 1 |
| Control 3 | Ionomer 2 + 20% of Concentrate 1 |
| Example 1 | Ionomer 1 + 2% of Antistatic 3 |
| Example 2 | Ionomer 2 + 2% of Antistatic 3 |

The results of the surface resistivity ("Surf Res") expressed as Ohm.m are given in the following table. "1.8E17" represents $1.8 \times 10^{17}$ Ohm.m., etc.

TABLE I

| Film Age Days) | Control 1 Surf. Res. (Ohm · m) | Control 2 Surf. Res. (Ohm · m) | Control 3 Surf. Res. (Ohm · m) | Example 1 Surf. Res. (Ohm · m) | Example 2 Surf. Res. (Ohm · m) |
|---|---|---|---|---|---|
| 0 | 1.8E17 | 1.8E17 | 1.8E17 | 4.0E15 | 2.0E11 |
| 1 | 9.4E15 | 2.2E13 | 7.5E17 | 8.0E12 | 9.0E11 |
| 7 | 1.8E17 | 2.7E12 | 1.9E17 | — | 1.0E12 |
| 30 | 1.8E17 | 6.9E11 | 1.8E17 | 2.0E13 | 4.0E11 |

Control 1 shows a high surface resistivity of the pure ionomers without an antistatic additive.

The addition of concentrate 1 (known combination of two antistatic agents) in Control 2 in which the ionomer is zinc-based leads to a low resistivity value only after long times (seven days at least), even some weeks after production, which is not desirable in some applications, because the film will still attract dust in the product environment. The addition of concentrate 1 to a sodium-based ionomer in Control 3 had no effect on resistivity.

Example 2 shows on the other hand that the antistatic agent of the present invention is functional in sodium-based ionomers from the initial measurement on. It can also be seen from Example 1 that the antistatic agent of the present invention is functional in zinc-based ionomers, although to a lesser extent.

What is claimed is:

1. A blend capable of being melt fabricated into an antistatic film comprising ethylene α,β-ethylenically unsaturated $C_{3-8}$ carboxylic acid copolymers having 0–99% of the carboxylic acid groups neutralized by metal ions, and an antistatic effective amount of polyoxyethylene sorbitan mono-fatty acid, having a viscosity at 25° C. of less than 2000 mega Pa.s, less than 50 ethyleneoxide groups, and a fatty acid chain length of from 9 to 20 carbon atoms.

2. The blend of claim 1 wherein the polyoxyethylene sorbitan mono-fatty acid is Polyoxyethylene Sorbitan Monolaurate.

3. The blend of claim 1 or 2 wherein the total amount of antistatic additive is within 0.5 and 3% based on weight of the copolymer plus the antistatic agent.

4. The blend of claim 3 wherein the copolymer is an ionomer.

5. The blend of claim 3 wherein the copolymer is an ionomer of ethylene containing 5–20 wt % methacrylic or acrylic acid neutralized 10 to 99% with sodium ions.

6. The blend of claim 1 or 2 melt fabricated into the form of a sheet or a film, supported or unsupported.

7. The blend of claim 6 wherein the film is extruded at temperatures above 250° C. and coated onto metal or onto a polymer film or paper.

8. The blend of claim 6 formed into a mono- or multi-layer film for packaging applications.

9. The blend of claim 6 formed into a sheet incorporated in a floor tile.

10. The blend of claim 6 formed into a sheet incorporated an auto interior component.

11. The blend of claim 6 formed into a film incorporated in a dry powdery package.

* * * * *